F. E. SMITH.
FILM DEVELOPING DEVICE.
APPLICATION FILED SEPT. 18, 1919.

1,367,435.

Patented Feb. 1, 1921.
2 SHEETS—SHEET 1.

WITNESSES

INVENTOR
Francis E. Smith
BY
ATTORNEYS

F. E. SMITH.
FILM DEVELOPING DEVICE.
APPLICATION FILED SEPT. 18, 1919.

1,367,435.

Patented Feb. 1, 1921.
2 SHEETS—SHEET 2.

UNITED STATES PATENT OFFICE.

FRANCIS EDWARD SMITH, OF NEW YORK, N. Y.

FILM-DEVELOPING DEVICE.

1,367,435.   Specification of Letters Patent.   Patented Feb. 1, 1921.

Application filed September 18, 1919. Serial No. 324,408.

*To all whom it may concern:*

Be it known that I, FRANCIS E. SMITH, a citizen of the United States, and resident of the city of New York, borough of Bronx, in the county of Bronx and State of New York, have invented a new and Improved Film-Developing Device, of which the following is a full, clear, and exact description.

This invention relates generally to a new and improved film developing device, and more particularly to an improved means for carrying and conducting a film during the developing process.

In the film developing machines and processes heretofore provided, difficulties have been encountered in getting the film started and properly positioned over the numerous rollers and pulleys, and in case the film breaks during the developing operation, the same diffiulties are encountered in splicing the film, and again starting the same. Further, in prior devices, no means has been provided for positively conveying or carrying the film through the developing operation in such a way that the film is gripped on each side, and is held at separated points in spaced relation to the carrier.

One of the objects of this invention is to provide a film carrying means which will overcome difficulties above noted in prior devices.

Another object of this invention is to provide a film carrying means which positively grips the film throughout its travel through the developing operation.

A further object of this invention is to provide a film carrying means which will facilitate the starting of the film in the developing process, and which will eliminate the necessity for having to splice a film in case the same breaks during the developing operation.

Still a further object of this invention is to provide a film carrying means which will hold the film in spaced relation from the main carrier and other parts, thus preventing the emulsion side of the film from becoming scratched or otherwise injured.

A further object of this invention is to provide a positive means of carrying the film so that the movement of the film is not dependent upon the friction of the film and movement thereof is not substantially effected by the contraction and expansion of the film.

Other objects and advantages will be apparent from the following description and the accompanying drawings.

Similar characters of reference designate like parts in the several views. In the drawings showing a practical embodiment of the invention:

Fig. 3 is a fragmentary top plan view showing a portion of the film tape arranged upon one of the carriers.

Fig. 4 is a fragmentary view partly in section, showing the film arranged between and spaced from the carriers.

Fig. 5 is an enlarged fragmentary view showing the carrier with the film tape therebetween passing over one of the gears.

Fig. 6 is a fragmentary view showing the gears in elevation, and the carriers and the film in section passing thereover.

Figure 1:
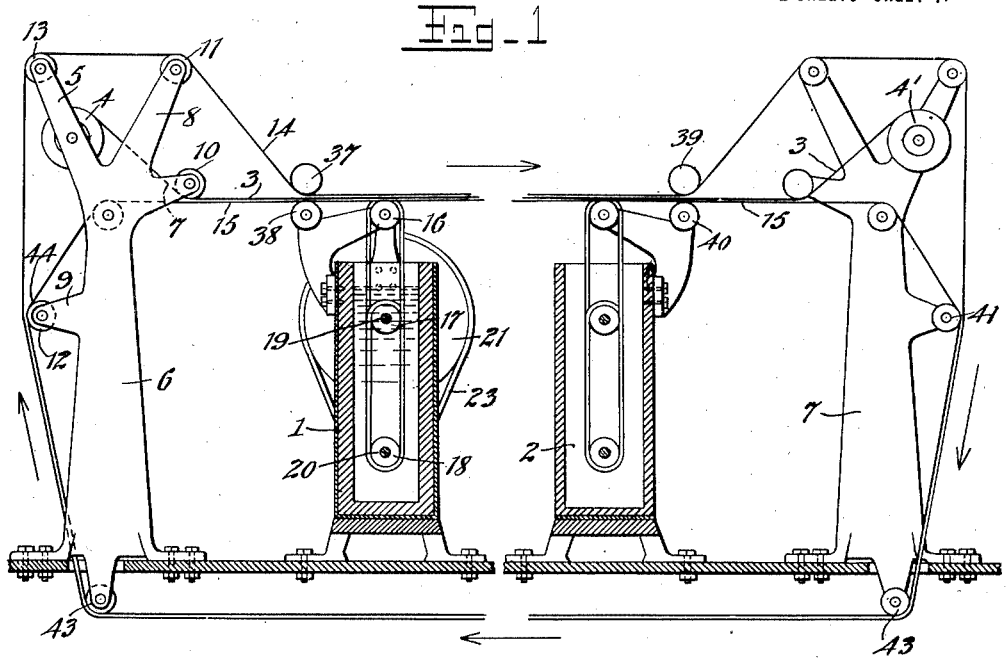
Figure 1 is a diagrammatic view showing certain of the developing receptacles, and one of the methods of arranging the endless carriers.

In Fig. 1 of the drawings, showing a practical embodiment of the invention, suitable receptacles 1 and 2 are shown, which receptacles correspond to the first and last receptacles through which a film tape 3 would pass in the developing operation. Of course it is understood that other tanks or receptacles may be provided, but for the present purpose, it is deemed sufficient to show the first and the last receptacle. For example, the receptacle 1, would represent a developing tank, and a receptacle 2, would represent a drying chamber.

In the form shown, the film tape 3 is carried in a film roll 4 which is rotatably mounted on an arm 5 of the support 6. The support 6 is provided with other arms 7, 8, and 9 on which are rotatably mounted guiding rollers 10, 11, and 12 respectively, a guiding roller 13 being mounted on the arm 5.

The support 6 is arranged adjacent to the first receptacle 1 of the film developing operation, and a similar support 7 is arranged adjacent the last receptacle 2 in the developing operation. The support 7 may in all substantial respects be similar to the support 6, the only difference being that the film roll 4' carried thereby receives the film tape 3 after it has been developed, instead of feeding the tape to the developer.

Figure 2:
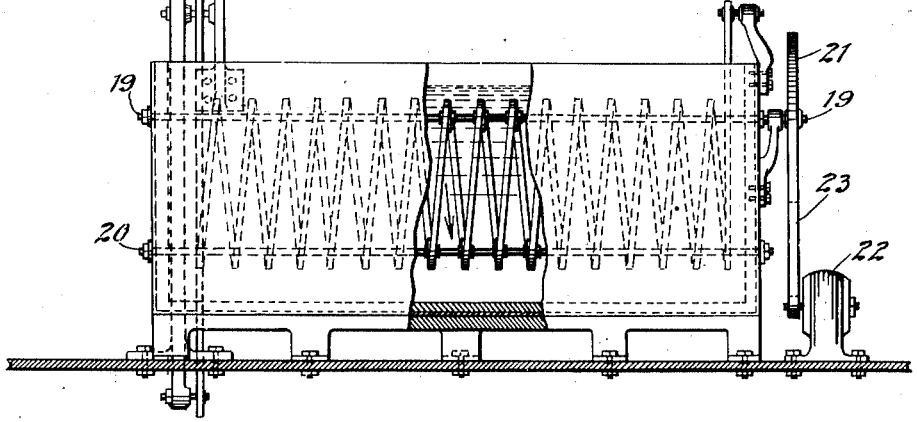
Fig. 2 is an elevation view partly broken away, showing one of the receptacles, and a driving means, showing also a method of carrying the carrier through the tanks.

The important feature of this invention is the provision of a means for carrying the film tape 3 through the various tanks and receptacles used in the developing operation. In devices heretofore provided, no means has been provided for positively guiding and carrying the tape through the tanks, the film tape being merely threaded and guided through the various receptacles on rollers. In such construction, great difficulty has been encountered in starting the film and in splicing the same if the film breaks during the developing operation. In order to overcome these objections, a plurality of endless overlying carriers 14 and 15 are provided, and so arranged that the film tape 3 is guided or carried therebetween, the said carriers functioning as a support for the film tape 13 throughout substantially the length of travel of the film through the various receptacles used in the developing process. In other words, the film tape 3 is carried between two carriers 14 and 15, the main portion of the film being held in spaced relation to the carrier, by a means later to be described, and the carriers, with the film therebetween are guided over rollers 16, 17 and 18 arranged in the tank 1, and in a manner as shown in Fig. 2, wherein the carriers are guided successively over the adjacent rollers mounted on the upper and lower shafts 19 and 20.

Any suitable driving means may be provided such as a pulley 21 mounted on the shaft 19, and driven from a suitable source of power such as a motor 22 by a belt 23 or other suitable means. From a receptacle 1, the carriers 14 and 15 with the film tape 3 therebetween, is conducted successively through the various tanks and receptacles provided in the developing process, and after passing from the last receptacles 2, the carriers 14 and 15 are separated, and the film tape 3 is wound upon a suitable receiving roll 4'.

In the practical embodiment shown, the carriers 14 and 15 are shown in Figs. 3 to 6 as comprising link members, certain of the links 24 of the carrier 15 having blocks 25 on the inner face thereof, and projections or pins 26. The films now commercially used are provided with openings 28 adjacent the edges of the film tape 3. As a means of positively engaging the film tape 3, and guiding the same throughout substantially the entire travel thereof, the film tape 3 is fed between the overlying carriers 14 and 15 and projections 26 of the carrier 15 extend through the openings 28 adjacent either edge of the film tape 3, and thus positively grips the same and carries it through the various receptacles. Certain links 27 of the carrier 14, which have the recesses 26' therein, are also provided with a block 29 which extends inward from the link, and aline with the blocks 25 carried by the links 24, so that when the film tape 3 is engaged, the main portion of the film is held in spaced relation to the links and other devices over which the carrier passes. The raised block portions 25 and 29 are mounted on the carriers 15 and 14 respectively, at spaced points thereof, the said points being arranged in any desired manner to suit the particular conditions. The spacing blocks 25 and 29 may be arranged on various links of the carriers independent of the projections 26. The projections 26, or other suitable means for engaging the film, are arranged preferably about every 5 feet, or such distance as is found to be necessary in order to effect a proper driving effort, it being understood that any desired arrangement may be used. One of the features to be kept in mind in the spacing of the film engaging device, is that they should be located at such points as will permit a certain contraction or expansion of the film as it is carried through the developing operation. This is a feature which may be varied to suit different conditions.

In carrier shown in the Figs. 3 to 5 the link carriers comprise an I shaped member 30 extending transversely of the carrier, and link portions 31 pivotally connected to the I shaped member 30 by a pin 32 or other suitable means. There is shown in Fig. 6 an enlarged view of one of the rollers or toothed wheels 33 over which the carriers are guided. The wheel 33 is provided with projecting tooth portions 34 which engage the carriers to drive the same.

In the practical operation, there will usually be sufficient play or movement between the link connections, to compensate for the movement about the toothed wheel or sprocket 33. However, if the desired movement is not afforded, any suitable means may be provided to compensate for the difference, such as a slot 35 in certain of the links. It is understood that in the practical application of the carrier, it is not necessary that all wheels or rollers over which the carrier passes, be provided with teeth, but certain of the rollers may function as idlers or guides therefor, the toothed wheel 33 preferably being mounted in any suitable manner on a power shaft 36.

There is shown in Fig. 4, an enlarged view of a portion of the carrier, showing the laterally extending bar 37 of the I link, and the film tape 3, in section. Spacing blocks 29 and 25 are shown, with the pins or projections 26, shown in Figs. 3 and 5, omitted.

In operation, preferably, a plurality of wheels 33, are spaced upon the shaft 36, so as to furnish a support for each side of the link carrier to drive the same. However, it is understood that any suitable arrangement may be provided.

In operation, the carrier is first set in motion, and the film roll or cartridge 4 would be placed in position, and the end of the film carried under the guide roller 10, after which the film would be placed upon the lower link carrier 15 so that certain of the pins 26 would extend through the openings 28 at the side of the film. The film would then be carried between the rollers 37 and 38 at which time the other link carrier 14 would overlie the carrier 15, and engage the other side of the film tape 3. The carrier with the film therebetween, would then pass through the various receptacles used in the developing operation, finally emerging from the last receptacle 2, passing between the rollers 39 and 40, after which the carriers would again separate, the end of the film tape 3 being guided on the receiving film roll or cartridge 4' which is actuated in any suitable manner to receive the tape. The carriers may again come together to overlie each other at any suitable point 41 from which point the carriers would be guided about other rollers 42, 43 and 44. After passing over the later roller 44, the respective carriers would separate, until the film tape 3 had again been received therebetween.

By providing a continuous positive carrying means throughout the travel of the film tape, it is not necessary to first thread the film over the various rollers and wheels in the many receptacles used in the developing operation. Further, if for any reason the film tape should break during the developing process, it is not necessary to stop the carrier, splice the broken ends, or rethread the film over the various rollers.

Another advantage further to be noted, is that the emulsion side and the main portion of the film is held in spaced relation to the carrier and other parts over which the carrier passes, thus minimizing the possibility of the film becoming scratched or otherwise injured.

While but one practical embodiment has been shown herein, it is to be understood that various changes and modifications may be made without departing from the spirit and scope of this invention.

Claims:

1. A film carrier comprising a pair of superimposed endless conveyers, means on the conveyers for positively engaging a film tape located between them, and means carried by the conveyers normally maintaining the film tape in spaced relationship thereto.

2. A film carrier comprising a pair of superimposed endless conveyers, pins on one of said conveyers adapted to engage the edge of a film tape, the other of said conveyers having recesses therein receiving the pins, and blocks carried by said conveyers normally holding the film tape in spaced relationship to both of said conveyers.

3. A film carrier comprising a pair of superimposed endless conveyers, pins in one of said conveyers adapted to engage the edge of a film tape, the other of said conveyers having recesses therein receiving the pins, and means carried by each conveyer normally holding the film tape in spaced relationship thereto.

4. A device of the character stated comprising a driving means, an endless conveyer driven by said driving means, pins on said conveyer adapted to engage the perforated edges of a film tape, another endless conveyer having recesses therein adapted to accommodate said pins, and means carried by both of said conveyers for spacing the film tape from the conveyers.

5. In a film developing apparatus, a pair of standards, a film delivering reel on one of said standards, a film receiving reel on the other of said standards, a plurality of developing tanks located betwen said standards, means for removing a film tape from said first mentioned reel, passing it through said tank and delivering it into said second mentioned reel, said means comprising an endless conveyer, pins carried by the conveyer adapted to engage the perforated edge of a film tape, another endless conveyer having recesses therein adapted to accommodate said pins, and means for driving said pin carrying conveyer.

FRANCIS EDWARD SMITH.